Sept. 24, 1974   V. A. CHASE   3,837,985
MULTI-DIRECTIONAL REINFORCED COMPOSITE AND METHOD
OF MAKING THE SAME
Filed Feb. 24, 1972
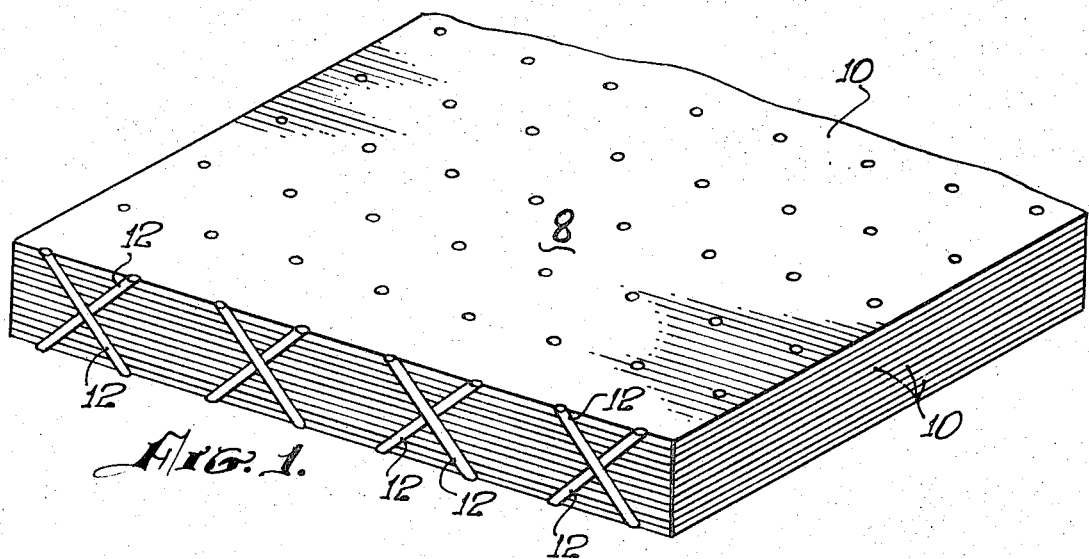
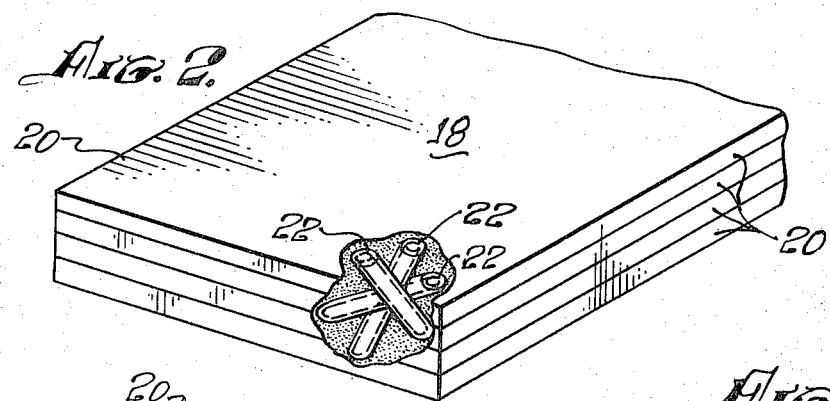
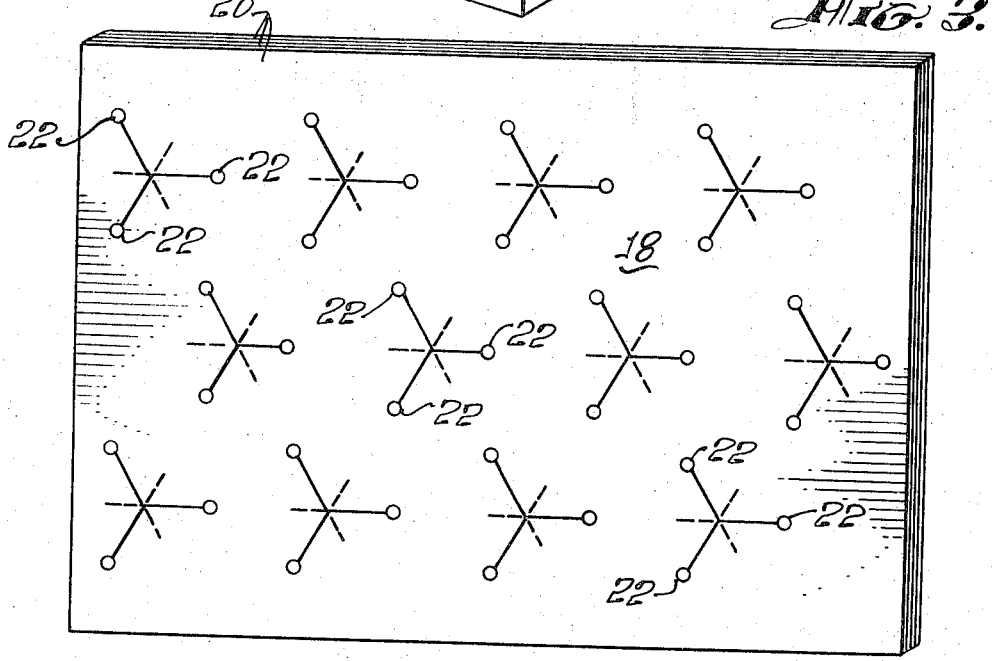

United States Patent Office 3,837,985
Patented Sept. 24, 1974

3,837,985
MULTI-DIRECTIONAL REINFORCED COMPOSITE AND METHOD OF MAKING THE SAME
Vance A. Chase, Poway, Calif., assignor to Whittaker Corporation
Filed Feb. 24, 1972, Ser. No. 228,929
Int. Cl. B32b 7/08
U.S. Cl. 161—55
16 Claims

ABSTRACT OF THE DISCLOSURE

An improved composite is fabricated by laying up a thickness of fibers bearing an uncured resin matrix, driving a series of spaced cured resin impregnated reinforcing elements at least partially through the lay-up at an angle, and then fully curing the resulting composite to bond the reinforcing elements into the lay-up.

BACKGROUND

Field of the Invention

The present invention generally relates to resin impregnated composites and more particularly relates to reinforced resin impregnated fibrous composites and an improved method of making the same.

Prior Art

Resin impregnated fibrous composites have been fabricated in a number of ways. In those composites requiring special multi-directional strength characteristics, for example, re-entry heat shields, so-called "three-dimensional" composites have been used to an increasing extent.

One method of fabricating such a composite employs a complicated and expensive weaving process, wherein fibrous threads are woven in three directions, i.e. longitudinally, transversely and normal to the surface of the preform. However, in those instances where the thickness of the preform must be substantial, as in heat shields which are of the order of ½ inch thick, the weaving problems are considerable. So also is the problem of molding quality composites therefrom after impregnation of the woven preform. This is particularly true where thermosetting matrices employing phenolic, polyimide, polyquinoxaline, polybenzimidazole or similar resins are used. Considerable difficulty is also encountered in maintaining the fibrous reinforcement of such three-dimensional preforms in straight alignment. In this regard, wrinkling and buckling of the fiber orientation both during the preform weaving and during the composite molding process frequently occur. In the areas where non-uniform alignment of the reinforcing fibers is thus created, the resin matrices must withstand initial stress until the fibers become straightened sufficiently to assume the load. Subjecting the resin matrices to such stress may result in resin cracking or crazing or more serious structural damage, so that the composite may fail.

More recently in an attempt to overcome the disadvantages of the woven preforming approach to the three-dimensional fiber reinforced composite requirements, such composites have been fabricated by a technique which involves laying up of the fibrous material onto a radial fiber brush so that the radial fiber reinforcing bundles are orthogonally disposed during the fabrication of the woven body. However, in order to achieve optimum tensile strength throughout the thickness of the resulting mold it is necessary to use small diameter closely spaced radial fiber bundles which are not practical in many instances from a fabrication standpoint. Unless the cross-sectional area of the radial fiber bundle is adjusted such that tensile failure and bond failure between the radial fiber and the remainder of the composite occur almost simultaneously, maximum efficiency and utility for the composite is not achieved. In addition, laying up or winding of the fibrous material on to the radial brush in this technique tends to be technically complex.

Accordingly, it would be desirable to provide a simplified, inexpensive commercially practical method of fabricating reinforced fibrous composites having a three-dimensional fiber alignment for reinforcement and strength.

SUMMARY

The present invention satisfies the foregoing needs and is substantially as set forth in the Abstract above. In accordance with the present method, any number of reinforced elements can be spaced at any number of angles through any portion of the lay-up of resin impregnated fibrous material before curing of the lay-up to lock in the reinforcing elements. Any suitable means can be used for driving the cured reinforcing elements into the lay-up and in one embodiment of the invention the elements are placed in spaced groups which group contains a plurality of elements of each group being at different angles to more effectively support the composite against tensional stress, shearing, bending, compression and the like.

DRAWINGS

FIG. 1 is a schematic perspective view of a preferred embodiment of the improved multi-dimensional reinforced composite of the invention utilizing a four-dimensional pattern;

FIG. 2 is a schematic perspective view of another embodiment of the improved multi-dimensional reinforced composite of the invention utilizing a five-dimensional pattern; and FIG. 3 is a top plan view of the composite of FIG. 2.

DETAILED DESCRIPTION

In accordance with the method of the present application, an improved multi-dimensional reinforced unitary composite of fibrous material is fabricated. The method includes laying up uncured resin impregnated fibrous material. In this regard, the fibrous material may be, for example, glass fibers, leached silica fibers, carbon fibers, graphite fibers or mixtures thereof or other types of fibers arranged in the form of woven cloth, roving, tape, single strands or the like. Such fibers are impregnated with resin of the thermosetting type, for example, polyimide, polyquinoxaline, polybenzimidazole and the like, and are in an uncured, that is, an A-staged or B-staged form. Sheets or plies of the resin impregnated fibrous material can be stacked to the desired thickness and shape. Alternatively, roving, tape, etc. can be laid up on a forming surface. In any event, after the lay-up is made it is reinforced by driving at least partially therethrough reinforcing elements fabricated of cured resin impregnated material such as C-staged thermosetting resin-impregnated fibrous reinforcements wherein the fibers are the same as or dissimilar from the above-mentioned fibers. The reinforcing elements contain resin which is compatible with the resin of the lay-up and are in relatively stiff self-supporting form capable of being easily driven into the lay-up, as by mechanical, pneumatic or the like driving means.

In accordance with the method of the present invention, a plurality of the reinforcing elements are driven into the lay-up with the elements spaced in accordance with a predetermined pattern and disposed into the lay-up at a predetermined angle. With this procedure, a three-dimensional composite reinforced in a given pattern is provided upon curing of the lay-up, i.e. C-staging to bond the reinforcing elements to the lay-up components to provide a unitary structure. Preferably, a second series of spaced cured resin impregnated reinforcing elements of the same or dissimilar types are driven into the lay-up at a second angle differing from the first angle and in a predetermined pattern to further reinforce the composite and provide the composite with a four-dimensional array. If such second series is used, it is introduced into the lay-up before the described curing of the lay-up occurs.

Although it is possible to drive the reinforcing elements into the lay-up at an angle normal to the surface of the lay-up to, in effect, duplicate existing three-dimensional composites in an improved less expensive manner, it is preferred that the present method be utilized to provide either a three-dimensional composite having reinforcing elements disposed at an angle other than that normal to the surface of the lay-up or, if normal to the lay-up, to additionally provide a second series of reinforcing elements introduced into the lay-up at an angle different from the first angle so that the described four-dimensional pattern can be achieved. Five-dimensional and greater dimensional patterns can be effected by varying the angle of additional series of reinforcing elements introduced to the lay-up, if desired, all before curing of the lay-up.

In accordance with a preferred embodiment of the present method, a plurality of series of the reinforced elements disposed at angles differing from one another are introduced into the lay-up in groups with each group comprising at least one reinforcing element of each of the series so that a pattern is developed in the lay-up of multi-dimensional groups serving as foci for improved resistance to bending, torsion and other dimensional stresses. It is obvious that this technique of grouping may be provided in any suitable pattern with or without interposed non-group oriented reinforcing elements at one or more angles in the lay-up.

In any event, whatever the means and sequences of introducing the reinforcing elements, after such introduction is completed the reinforcing elements are bonded to the lay-up by the curing step of the method usually involving heating with or without the application of superatmospheric pressure. Moreover, during such curing, the reinforced lay-up can be disposed, if desired, within a suitable mold so as to be configured to the desired finished or semi-finished shape, depending upon the intended ultimate use thereof. Alternatively, if the lay-up is initially made on or in a shape-imparting means, e.g. a mandrel, subsequent molding usually will be obviated. The placement of the reinforcing elements is such as to not in any way interfere with the curing procedure and any molding which may be employed. Accordingly, an improved composite is obtained with multi-dimensional reinforcements by a method which is simplified, inexpensive, rapid and reproducible. The method results in undistorted composites which can incorporate specialized areas, as needed, of particularly high resistance to stress. In this regard, the method of the invention can be tailored to the particular need of the end product in an improved simplified way.

The laminated reinforced composite of the invention is illustrated schematically in FIGS. 1 to 3 of the accompanying drawings. In this regard, FIG. 1 depicts a four-dimensional pattern in the composite. Thus, a reinforced composite 8 is shown comprising a stack of plies 10 of resin impregnated fiber material with the plies C-staged bonded together and to spaced pairs of reinforcing elements 12. Elements 12 are disposed entirely through the stack of plies 10 at a 45° angle from horizontal (plane of the stack), the elements 12 of each pair being at a 90° angle from each other nad overlapping at their mid-points. Each reinforcing element 12 is generally cylindrical in configuration and comprises C-staged resin impregnated fibers. Accordingly, multi-dimensional strength is achieved.

In FIGS. 2 and 3, an improved composite 18 is shown comprising a stack of plies 20 with reinforcing elements 22 therein. Each ply 20 is fabricated of C-staged resin-impregnated fibrous material and plies 20 are bonded to elements 22. The latter are generally cylindrical are fabricated of C-staged resin-impregnated fibrous material. Elements 22 are arranged in spaced groups of three elements each. The elements 22 of each group are disposed in triangular array at 120° from each other and are slanted down through the stack of plies 20 so that their midpoints overlie one another at about the mid-point of the stack. FIG. 3 shows this array in schematic outline. Accordingly, a five-dimensional reinforced composite is provided.

The following Examples further illustrate certain features of the present invention:

EXAMPLE I

An ablative re-entry heat shield having good ablation characteristics, low thermal conductivity and high strength in the wall thickness direction is fabricated in the following manner: A lay-up is made of the basic shape and size of the heat shield by tape wrapping over a mandrel in a conventional manner carbon fiber tape impregnated with B-staged phenolic resin. The tape is wrapped on the mandrel during the wrapping process at a 20° angle to the surface of the mandrel to provide a "shingle effect." The wrapping procedure is continued until a wall thickness of about 0.500 inch in obtained.

After completion of the tape wrapping procedure and while the resulting lay-up is still in a B-staged condition and on the mandrel, a mechanical impact tool is used to drive C-staged reinforcing elements through the wall thickness at an angle normal to the plane of the surface of the lay-up. Each reinforcing element comprises a shaft fabricated of layers of carbon fibers impregnated with phenolic resin and C-staged under heat and pressure. A plurality of the reinforcing elements are cut from a stack of the C-staged carbon fiber laminate such that the plies of the stack run the length of each element. Each element is cut and then machined to a square configuration with a diameter of about 0.050 inch and a length of about 0.500 inch. To facilitate introduction of each reinforcing element into the lay-up on the mandrel, the introducing end of the element is slightly tapered. The reinforcing elements are driven through the lay-up by the mechanical tool until the outer end of each reinforcing element is flush with the outer surface of the lay-up, i.e. until each element extends through the lay-up. The reinforcing elements are distributed throughout the lay-up in a uniform pattern such that each reinforcing element is approximately 0.200 inch away from the next adjoining reinforcing elements in the pattern. Thereafter, the lay-up with the reinforcing elements dispersed therein is C-staged at approximately 100 p.s.i. and 350° F. in an autoclave to fully cure the resulting heat shield and lock and permanently bond the reinforcing elements to the lay-up.

EXAMPLE II

The procedure set forth in Example I is duplicated except that the pattern of reinforcing elements is substantially that indicated in FIG. 2 of the accompanying drawings. FIG. 2, however, represents the pattern as viewed in a flat plane or stack rather than the curved lay-up configuration for the heat shield. The reinforcing elements are driven into the lay-up in a pattern to provide spaced groups of three elements each, with the angle of inclination of the elements to the lay-up surface being about 45° and with the angle between adjacent elements in each group being about 120°. Each group of elements thus formed provides reinforcement in five directions. The spacing between groups of elements is approximately 0.200 inch.

EXAMPLE III

The procedure of Example I is followed except that the reinforcing elements are spaced apart approximately 0.400 inch, are approximately 0.100 inch in diameter and the angle at which the elements are driven through the wall of the heat shield is approximately 45° to the plane of the surface of the shield at the point of entry.

EXAMPLE IV

Successful composites fabricated in accordance with the procedures of Examples I, II and III are provided utilizing fibrous material such as fiber glass, graphite, silica and high temperature plastic fibers in roving, tape, single fiber windings, cloth and the like, together with phenolic, polyimide, polybenzimidazole and other high temperature thermosetting resin matrices. Laminates are made utilizing a plurality of types of fibrous materials and/or resin matrices. Thus, fiber glass-phenolic resin composites, fiber glass-polyimide resin composites, graphite fiber-phenolic resin composite and multi-component laminates including fiber glass, carbon and graphite fibers in interleaved and overlapping areas with various types of thermosetting resins are employed, all with successful results.

In further tests, yarn, roving and tow are utilized in separate fabrication procedures by winding the same upon mandrels of suitable size and shape to provide the desired initial fiber rendition. In one instance, for a conical shape in fabricating a re-entry heat shield a fiber rendition is provided for a helix pattern where the fiber material is wound from the base to the tip of the cone at one angle and reversed to wind from the tip to the base at the same winding rate and angle.

Reinforcing elements in all instances are introduced in preforms patterned in accordance with the previous techniques. In one instance the groups of reinforcing elements are introduced into a stack of plies of resin-impregnated fibrous cloth with two elements per group, each element being forced into the stack at an angle approximately 45° to the plane of the surface of the stack and the two elements being aligned to provide an angle therebetween of about 90° with the elements substantially overlapping each other at the mid points thereof, substantially as is shown in FIG. 1 of the accompanying drawings, to provide a four-dimensional configuration.

In the fabrication of filament wound radomes and the like high strength and stiffness in both the axial and hoop directions is achieved by winding strands of phenolic resin impregnated fiber on to a male mandrel in an alternating hoop and axial winding pattern and then reinforcing the resulting lay-up by forming groups of two reinforcing elements each, the elements of the group being disposed at intersecting angles and locations to provide a four-dimensional reinforced composite structure having a good balance of strength in the axial, hoop and radial directions. After insertion of the reinforcing elements (by pneumatic hammer means) the resulting-reinforced lay-up is cured at about 120 p.s.i. and about 340°. Pressure is applied from both the exterior and the interior surfaces, the latter by means of a pressurized flexible diaphragm disposed on the surface of the male mandrel.

In all of the above instances, unitary multi-directional reinforced composites are provided in an improved simplified manner with areas of special strength developed to facilitate improved durability and performance in use.

What is claimed is:

1. An improved, rigid ablative, multi-directional reinforced unitary composite structure comprising:
   (a) a rigid lay-up of cured resin impregnated multi-directional fibrous material; and
   (b) a series of rigid self-supporting spaced cured resin impregnated fibrous reinforcing rods bonded to and disposed in said lay-up at a first angle other than normal to the surface of said lay-up.

2. The improved multi-directional reinforced unitary composite of claim 1 wherein a second series of spaced cured resin impregnated fibrous reinforcing rods is bonded to and disposed in said lay-up at a second angle differing from said first angle.

3. The improved multi-directional reinforced unitary composite of claim 2 wherein said composite includes a third series of spaced cured resin impregnated fibrous reinforcing rods bonded to and disposed in said lay-up at a third angle differing from said first and second angles.

4. The improved multi-directional reinforced unitary composite of claim 2 wherein at least a portion of said reinforcing rods are disposed in said lay-up in groups, each group comprising at least one reinforcing rod of each of said first and second series.

5. The improved multi-directional reinforced unitary composite of claim 3 wherein at least a portion of said reinforcing rods are disposed in said lay-up in groups, each group comprising at least one reinforcing rod of each of said first, second and third series.

6. The improved multi-directional reinforced unitary composite of claim 3 wherein series in addition to said three series of spaced cured resin impregnated fibrous reinforcing rods are bonded to and disposed in said lay-up at angles other than those angles of said first three series.

7. The improved multi-directional reinforced unitary composite of claim 1 wherein said lay-up comprises sheets of two-directional woven high temperature resistant ablative fibrous material impregnated with uncured thermosetting resin and wherein said fibrous reinforcing rods comprise high temperature resistant material impregnated with cured thermosetting resin compatible with said resin of said sheets.

8. The improved multi-directional reinforced unitary composite of claim 2 wherein said lay-up comprises stacked sheets of two-directional woven high temperature resistant ablative fibrous material impregnated with B-staged thermosetting resin and wherein said reinforcing rods comprise high temperature resistant material impregnated with C-staged thermosetting resin compatible with said resin of said sheets.

9. A method of fabricating an improved, rigid, ablative multi-directional reinforced unitary composite structure which method comprises:
   (a) laying up uncured, resin impregnated, multi-directional, fibrous material;
   (b) driving a series of rigid, spaced, cured, resin impregnated fibrous reinforcing rods at least partially through said lay-up at a first angle to the surface of said lay-up; and
   (c) thereafter fully curing and rigidifying the resulting reinforced composite ablative structure to bond said reinforcing rods to said lay-up.

10. The method of claim 9 wherein a second series of spaced, cured resin impregnated fibrous reinforcing rods is driven before said curing at least partially through said lay-up at a second angle different from said first angle.

11. The method of claim 10 wherein a third series of spaced, cured, resin impregnated fibrous reinforcing rods is driven at least partially through said lay-up at an angle different from said first and second angles before said curing.

12. The method of claim 11 wherein series of reinforcing rods in addition to said third series are driven at least partially through said lay-up at angles other than said three angles prior to said curing.

13. The method of claim 10 wherein at least a portion of said reinforcing rods are disposed in said lay-up in groups each comprising at least one reinforcing rod each of said first and second series.

14. The method of claim 11 wherein at least a portion of said reinforcing rods are disposed in said lay-up in groups each comprising at least one reinforcing rod each of said first, second and third series.

15. The method of claim 9 wherein before said curing said lay-up comprises stacked sheets of two-directional woven, high temperature resistant fibrous material impregnated with uncured thermosetting resin and wherein before said curing said reinforcing rods comprise high temperature resistant material impregnated with cured thermosetting resin compatible with said resin of said sheets.

16. The method of claim 10 wherein before said curing said lay-up comprises stacked sheets of two-directional woven high temperature resistant fibrous cloth material impregnated with B-staged thermosetting resin and wherein before said curing said reinforcing rods comprise high temperature resistant material impregnated with C-staged thermosetting resin compatible with said resin of said sheets.

References Cited

UNITED STATES PATENTS

| | | | |
|---|---|---|---|
| 3,647,606 | 3/1972 | Notaro | 161—52 |
| 3,230,995 | 1/1966 | Shannon | 156—166 |
| 3,216,167 | 11/1965 | Roberts | 52—612 |
| 3,350,249 | 10/1967 | Gregoire | 156—92 |
| 3,142,610 | 7/1964 | Lowe | 161—54 |

GEORGE F. LESMES, Primary Examiner

W. R. DIXON, JR., Assistant Examiner

U.S. Cl. X.R.

52—622; 102—105; 156—91, 92, 253, 303.1; 161—50, 53, 84, 85

Notice of Adverse Decision in Interference

In Interference No. 99,654, involving Patent No. 3,837,985, V. A. Chase, MULTI-DIRECTIONAL REINFORCED COMPOSITE AND METHOD OF MAKING THE SAME, final judgment adverse to the patentee was rendered Mar. 7, 1978, as to claims 9 and 15.

[*Official Gazette August 8, 1978.*]